United States Patent [19]
Wiggerman

[11] Patent Number: 6,019,489
[45] Date of Patent: Feb. 1, 2000

[54] ARTICULATED LIGHT HEAD FOR NAVIGATIONAL LIGHTS

[75] Inventor: Ronald E. Wiggerman, McHenry, Ill.

[73] Assignee: Aqua Signal Corporation, Batavia, Ill.

[21] Appl. No.: 09/188,269

[22] Filed: Nov. 9, 1998

[51] Int. Cl.[7] ............................................. B60Q 1/26
[52] U.S. Cl. .................................. 362/477; 362/549
[58] Field of Search ............................ 362/477, 485, 362/523, 549, 269, 282, 287, 427, 285, 418; 114/66, 343; 340/985

[56] References Cited

U.S. PATENT DOCUMENTS

| | | | |
|---|---|---|---|
| 3,423,089 | 1/1969 | Andis | 362/282 |
| 4,360,859 | 11/1982 | Ziaylek, Jr. | 362/285 |
| 4,654,764 | 3/1987 | Hsiao | 362/269 |

*Primary Examiner*—Y. Quach
*Attorney, Agent, or Firm*—Knechtel, Demeur & Samlan

[57] ABSTRACT

An articulated light head for navigational lights on motor boats. The light head incorporates a movable stem plate within an articulator base for manual positioning of the navigational light with respect to its supporting conventional hull pole as attached to the hull of the boat. The movable stem plate is frictionally secured between a stem plate trapper and the articulator base. A light base is fitted on top of the articulator base enclosing both the movable stem plate and stem plate trapper within the light head. A navigation light is supported by the light base and powered by electrical current directed through the light head. The navigation light is protected by a dome which fits over the light base.

15 Claims, 1 Drawing Sheet

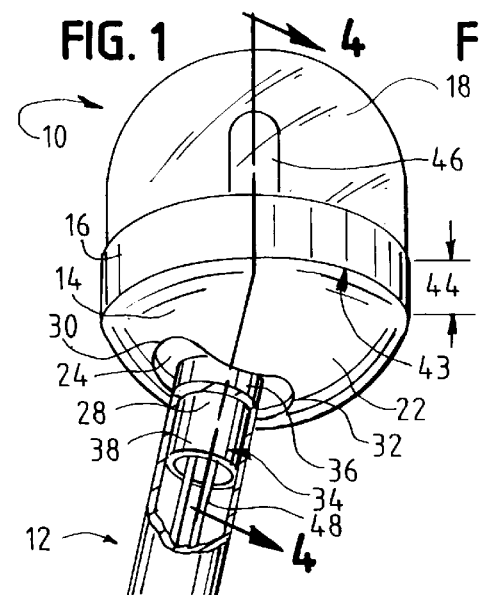
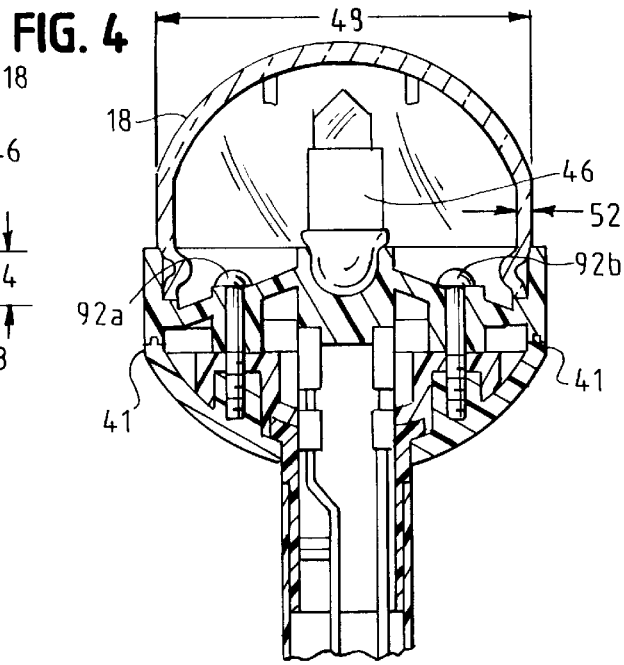
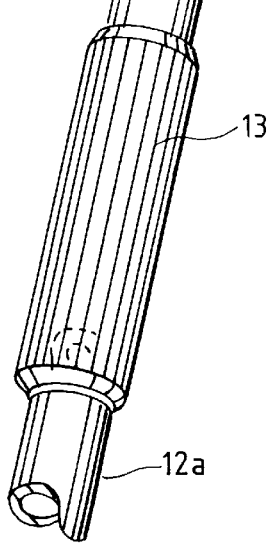
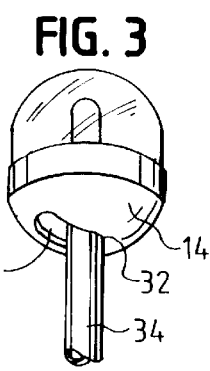
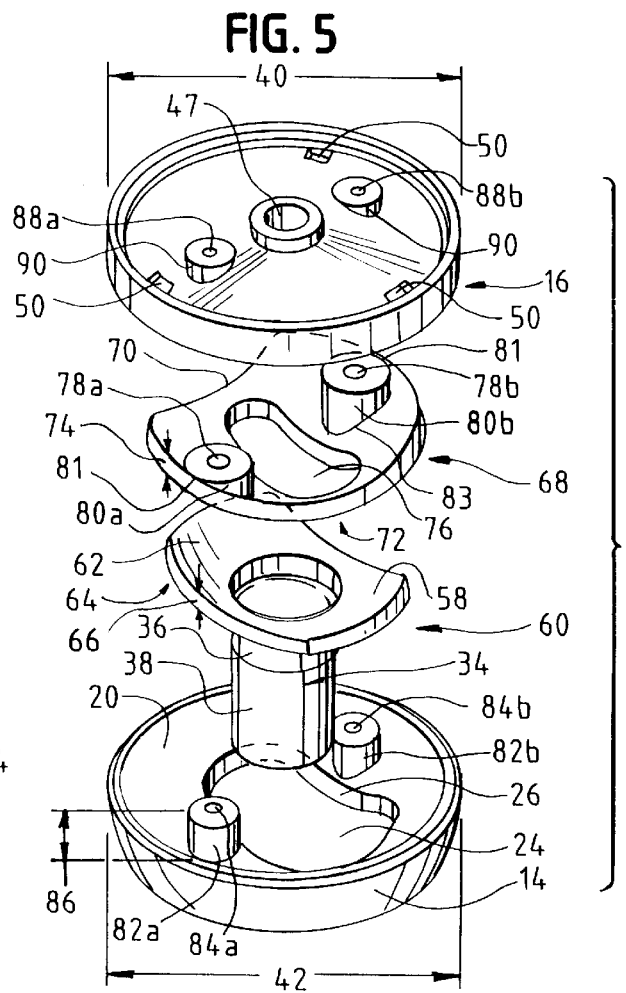

ARTICULATED LIGHT HEAD FOR NAVIGATIONAL LIGHTS

I. FIELD OF THE INVENTION

The present invention relates to navigational lights for motor boats and, more particularly, to the articulation of navigational lights about a conventional hull pole for proper directional alignment of light emanating from navigational lights.

II. DESCRIPTION OF THE PRIOR ART

Regulations require motor boats to have navigational lights. Typically, the navigational lights are placed at both the bow and the stern of a boat. Due to the placement of the navigational lights at the stern of a boat, regulations further require that the stern navigational lights radially project light toward the forward direction of the boat and unobstructed by the bow of the boat, the windshield of the boat, or its passengers. This unobstructed placement of the navigational light permits two boats, on course for a head on collision, to see the navigational lights of the other boat in time to avoid an accident. In the simplest of scenarios for a flat, horizontal boat hull, a conventional hull pole is perpendicularly attached to and extends a sufficient distance vertically from the hull of the boat such that placement of a navigational light on top of the hull pole will permit unobstructed view and light projection to satisfy the boating regulations.

With the advent of new technology, the boating industry has witnessed the creation of more aerodynamic and aesthetic looking boats, with each manufacturer striving for its own unique design. The result has been the emergence of varying boat hull shapes. In accordance with the regulations, the boats are manufactured for the inclusion of hull poles at the stern for placement of the navigational lights. However, due to the varying shapes of the boat hulls, the hull poles must be placed in various positions. With the varying placement of hull poles, the hull poles must be individually configured, through different bending of the hull pole, in order to place the navigational light on top of the hull pole and continue to satisfy boating regulations, especially the requirement that the light extend above the boat windshield. As a result, each manufacturer must provide, at increased costs to the consumer, a new reconfigured hull pole for each of its unique boat designs. This burden, on both the manufacturer and consumer, is unnecessary and avoidable if the navigational light is designed to accommodate a conventional hull pole for all current and future unique boat designs of the manufacturers.

The following prior art discloses and claims various mounting devices for boat lights; however, none of the prior art devices discloses an articulation means that can be utilized in navigational lights to solve the problem manufacturers are confronted with in connection with conventional hull poles.

In U.S. Pat. No. 4,360,859 for "Boat Light Having Resiliently Flexible and Adjustable Mount" there is disclosed a boat light recessed within the hull of cabin cruisers and other water craft for illumination of light directed along selected paths. The boat light is resiliently flexible and adjustably mounted for repositioning the direction of light using a metal clamping ring that contracts around a soft rubber mounting ring to secure the retaining member of the light in its adjusted position. A shortcoming of this boat light is that although the boat light is mounted in an opening within the boat hull, it is not designed as a navigational light for placement on top of a hull pole at the stern of a boat. Another shortcoming is that the boat light is recessed within a retaining member and only able to project light in a specific direction, not radially in all directions as required of navigational lights for boats. A further shortcoming is that the device does not provide for articulation repositioning of the boat light and, therefore, does not solve the problem manufacturers are having with hull poles for supporting navigational lights.

In U.S. Pat. No. 5,398,177 for "Assembleable Lighting System" there is disclosed a lighting system mounted to a bar or beam member and adjustably movable along the bar or beam member. A problem with this device is that although the placement of the light may be variably positioned along support poles at the stern of boats, it does not circumvent the manufacturers having to design a new hull pole for each of its unique boat designs. Another problem is that the device is devoid of an articulation means which would render absolute the reconfiguration of hull poles for navigational lights.

In U.S. Pat. No. 4,412,274 for "Support Housing for a Vehicle Headlamp" there is disclosed a headlamp for a vehicle that is mounted within a support housing and bracket member permitting the horizontal and vertical adjustment of the headlamp. An inherent shortcoming of this device is that although the recessed headlamp repositioning performs well for vehicles, it does not permit articulation of navigational lights perched at the end of hull poles to solve the manufacturers problem of having to continue redesigning new hull poles for each unique boat design. Another inherent shortcoming is that the device is recessed within a support housing and able to project light in a specific direction only, not radially in all directions as required of navigational lights for boats.

In U.S. Pat. No. 2,504,866 for "Docking Light" there is disclosed an adjustable boat light mounted within the hull of a boat to direct the rays of the boat toward the surface of the water, specifically near docks. The boat light is recessed within a holder in a socket and permitted adjustment through the clamping of a ring about the holder. A shortcoming of this device is that it does not provide for an articulation means for adjusting a navigational light with respect to a conventional hull pole that is applicable to every manufactured unique boat design. Another shortcoming is that the boat light is recessed within a holder and only able to project light in a specific direction, not radially in all directions as required of navigational lights for boats.

In U.S. Pat. No. 4,017,998 for "Fishing Rod Holder" there is disclosed a frame with a socket for receiving a fishing rod. The fishing rod is pivotally connected to the frame by a pin which permits the fishing rod to move within the socket and to be secured in place by a detent means. A problem with this device is that it does not provide or disclose an articulation means for adjusting a navigational light with respect to a conventional hull pole. Another problem with this device is that although the device uses a frame and securing means for permitting movement of a complete support pole for navigational lights, it does not alleviate the necessary reconfiguration of hull poles for every manufactured unique boat design. Another problem is that the device is not applicable to securing navigational lights to support poles.

There is a need, therefore, and there has never been disclosed an articulated light head for navigational lights that is adjustable for proper alignment of the navigational light at the end of a conventional hull pole in order to radially direct the emanating light in accordance with boating regulations. Applicant's invention provides a light head designed to accommodate such a purpose.

III. OBJECTS OF THE INVENTION

It is the primary object of the present invention to provide an articulated light head for variable positioning of navigational lights with respect to conventional hull poles for use on any unique boat design. A related object of the present invention is to provide a navigational light that meets the boating regulations for every unique boat design.

Another object of the present invention is to remove the burden on boat manufacturers from having to reconfigure conventional hull poles for every unique boat design. A related object of the invention is to design a navigational light head that satisfies the manufacturers' requirements for use on conventional hull poles on all current and future boat designs.

Still another object of the invention is to prevent the unnecessary additional expense for manufacturers in reconfiguring hull poles that ultimately becomes the financial responsibility of the consumers purchasing the boats.

Other objects of the present invention will become more apparent to persons having ordinary skill in the art to which the present invention pertains from the following description taken in conjunction with the accompanying drawings.

IV. SUMMARY OF THE INVENTION

The above objects of the present invention are provided for in an articulated light head for navigational lights. According to the invention, the articulated light head has four main parts: an articulator base, a movable stem plate, a stem plate trapper, and a light base.

The articulator base has an elongated slot for receiving within the articulator base the movable stem plate. The movable stem plate has a stem which, following insertion into the elongated slot of the articulator base, protrudes outwardly from the bottom of the articulator base for attachment to a conventional hull pole. The movable stem plate also has a plate for traversing the elongated slot for variable positioning of the stem. The stem plate trapper is positioned on top of the movable stem plate within the articulator base. The light base attaches to the articulator base to form a light head that encloses both the movable stem plate and stem plate trapper within the light head. Upon the tightening of the light base to the articulator base, the movable stem plate is secured in its desired position between the stem plate trapper and the articulator base, thereby, forming an articulated light head for navigational lights.

V. BRIEF DESCRIPTION OF THE DRAWINGS

The Description of the Preferred Embodiment will be better understood with reference to the following figures:

FIG. 1 is a perspective view of the articulated light head in its assembled configuration and attached to a conventional hull pole.

FIGS. 2 and 3 are two examples of the variable positions that the articulated light head may occupy with respect to conventional hull poles.

FIG. 4 is a side cross-sectional view, along line 4—4 of FIG. 1, of the articulated light head in its assembled configuration.

FIG. 5 is an exploded side view of the articulated light head particularly showing the individual assembled parts with portions removed.

VI. DETAILED DESCRIPTION OF THE PREFERRED EMBODIMENT

Turning first to FIG. 1, a representative example of an articulated light head 10 is depicted. The articulated light head 10 is situated on a hull pole 12. Typically, the hull pole 12 is cylindrical in shape with a hollow bore extending throughout the center of the hull pole 12. In one embodiment, the hull pole 12 may have an in-line connector 13 in order to accommodate additional hull poles 12a to be connected in line to lengthen the height of the hull poles 12 to accommodate the boat size. The hull pole 12, at the opposite end of the articulated light head 10, is attached to the hull of a boat located typically in the stern.

The articulated light head 10 is preferably made of a durable grade plastic. Alternatively, any other type of durable weather resistant material may be used. The articulated light head 10 has an articulator base 14, a light base 16, and a dome 18.

The articulator base 14 is bowl shaped with a top 20 (FIG. 5) and a bottom 22. The bottom 22 of the articulator base 14 has an elongated slot 24. The elongated slot 24 is positioned slightly off center within the bottom 22 of the articulator base 14. The elongated slot 24 has two parallel sides 26 (FIG. 5) and 28 and two half arcs 30 and 32 at each end of the parallel sides 26 and 28. Protruding through the elongated slot 24 of the articulator base 14 is a stem 34. The stem 34 is cylindrical in shape with a hollow bore extending throughout the center of the stem 34. The stem 34 has a stem first portion 36 and a stem second portion 38. The stem first portion 36 has an outside diameter approximately equal to the distance between the two parallel sides 26 and 28. The stem first portion 36 also has a cylindrical shape that approximates the two half arcs 30 and 32 at each end of the parallel sides 26 and 28. As the parallel sides 26 and 28 of the elongated slot 24 are longer than the diameter of the stem first portion 36 of the stem 34, the stem 34 is permitted to traverse along and be guided by the parallel sides 26 and 28 of the elongated slot 24 between half arc 30 and half arc 32. When the stem first portion 36 of the stem 34 reaches half arc 30 or half arc 32, each will act as a stopping means to prevent the stem 34 from proceeding any further along the elongated slot 24 in that direction. As a result, the stem 34 may be positioned anywhere along the elongated slot 24 between the parallel sides 26 and 28 and within the half arcs 30 or 32.

The stem second portion 38 of the stem 34 is frictionally engaged within the hollow portion of the hull pole 12. The hull pole 12 receives all of the stem second portion 38 of the stem 34. The hull pole 12 stops receiving the stem second portion 38 upon the hull pole 12 engaging the stem first portion 36 which prevents the further insertion of the stem 34 into the hull pole 12.

The light base 16 is cylindrical in shape with a light base diameter 40 (FIG. 5). The light base 16 is placed over the top 20 (FIG. 5) of the articulator base 14. The light base 16 engages the articulator base 14 at connection point 41 (FIG. 4). The articulator base 14 has an articulator base diameter 42 (FIG. 5) which is approximately equal to the light base diameter 40 (FIG. 5). As a result, the exterior of the light base 16 is flush with the exterior of the articulator base 14 at connection point 41 (FIG. 4). The light base 16 has a thickness 44 which elevates the light base 16 above the articulator base 14. The combination of the light base 16 with the articulator base 14 forms a light head base 43.

Situated on the light base 16, at the opposite end of the articulator base 14, is a light bulb 46. The light bulb 46 must be of sufficient strength to emanate light over large distances and comply with navigational requirements for required candle power. The light base 16 has a light cup 47 (FIG. 5) for receiving and releasably retaining the light bulb 46. The light bulb 46 receives its power from a battery on the boat through an electrical current conducted through wires 48. The wires 48 are inserted through the hollow bore of the hull pole 12 and the hollow bore of the stem 34 into the articulated light head 10 to power the light bulb 46, as is well known in the art. In the preferred embodiment, the hull pole 12 has an in-line connector 13 to facilitate additional lengths of hull poles 12 should the boat size require an extended articulated light head 10 with each similarly adapted for the wires 48.

The dome 18 is situated on the same side as the light bulb 46 of the light base 16. The dome 18 has a dome diameter 49 (FIG. 4) which is slightly less than the light base diameter 40 (FIG. 5). The light base 16 has at least three dome secure points 50 (FIG. 5) for procuring the attachment of the dome 18 to the light base 16. The dome 18 is inserted into the dome secure points 50 (FIG. 5) and then rotated in a clockwise direction to lock the dome 18 into position on the light base 16. It will be understood, however, that various attachment means may be employed to attach the dome 18 to the light base 16. The dome 18 encapsulates the light bulb 46 within the dome 18. The dome 18 has a dome thickness 52 (FIG. 4) which is made of a durable plastic, transparent material. The dome 18 serves to protect the light bulb 46 from the rain, dew, insects, or other adverse elements. The dome 18 is made of transparent material to allow the light emanating from the light bulb 46 to escape from the dome 18 and, thereby, radiate in all directions. Preferably, the transparent material of the dome 18 should neither reduce the light emanating from the light bulb 46 nor reflect the light emanating from the light bulb 46 into different directions.

Turning to FIGS. 2 and 3, the articulated light head 10 is illustrated in its variable positions within half arcs 30 and 32 along the elongated slot 24 of the articulator base 14. The articulated light head 10 must always be in the vertical position for safety and maximum visibility. As such, the vertical position of the articulated light head 10 permits the light bulb 46 to radiate light in all directions to serve its safety functions and in accordance with boating regulations. The elongated slot 24 of the articulator base 14 allows the stem 34 to traverse an articulating angle 56 with respect to its vertical position within the articulator base 14. In the preferred embodiment, the articulating angle 56 has a minimum angle of 0° as illustrated in FIG. 3 and a maximum angle of approximately 15° as illustrated in FIG. 2. Given the current boat designs in the marketplace today, the maximum articulating angle 56 is sufficient for use on any conventional hull pole 12 (FIG. 1) used on those boats. The articulating angle 56 may be increased if the need so arises due to manufacturers designing boats that require a larger articulating angle 56 in order to continue positioning the articulated light head 10 in the vertical position after attachment to the conventional hull pole 12 (FIG. 1). The reason the articulator base 14 is bowl shaped with a bottom 22 that has a convex shape and the elongated slot 24 is slightly off center within the convex bottom 22 is to enable the stem 34 to procure higher angles 56 with respect to its vertical position within the articulator base 14.

Turning to FIG. 4, the light bulb 46 releasably retained into the light cup 47 (FIG. 5) is more clearly illustrated. In the preferred embodiment, the light bulb 46 does not touch the dome 18. The space required between the light bulb 46 and the dome 18 must be sufficient such that the heat transferred from the light bulb 46 to the dome 18 does not cause any melting or disfiguring damage to the dome 18 that might alter the purpose that the dome 18 provides or impair the light emanating from the light bulb 46.

Turning to FIG. 5, an exploded view of the articulated light head 10 is shown illustrating the assembly of parts utilized in forming the articulated light head 10 and in creating the articulation means by securing the stem 34 in position within the elongated slot 24 of the articulator base 14. The stem 34 is attached to a plate 58. In the preferred embodiment, the stem 34 and the plate 58 may be injection molded into a single piece, a movable stem plate 60, for the functionality of the articulation to be useful. The plate 58 has a plate top 62 and a plate bottom 64. The plate top 62 is a concave arc and the plate bottom 64 is a convex arc. The plate top 62 and the plate bottom 64 are separated by a plate thickness 66. As the stem 34 of the movable stem plate 60 is inserted through the elongated slot 24 of the articulator base 14, the plate bottom 64 of the plate 58 engages the top 20 of the articulator base 14 and stops the stem 34 and the movable stem plate 60 from entering any further into the articulator base 14. Preferably, the surface of the top 20 is rippled to create increased friction between the top 20 and the plate 58 to aid in securing the stem 34 in its desired position. In the preferred embodiment, the plate 58 completely covers the elongated slot 24. The reason for completely covering the elongated slot 24 with the plate 58 is to alleviate an opening that would allow rain, dew, insects, or other elements internal access into the articulated light head 10. The plate 58 is large enough to prevent an opening between the plate 58 and the elongated slot 24 at all positions of the stem 34 along the elongated slot 24. More importantly, the size of the plate 58 allows the movable stem plate 60 to be properly secured at all positions along the elongated slot 24 of the articulator base 14.

Upon insertion of the movable stem plate 60 into the articulator base 14, a stem plate trapper 68 is used to secure the movable stem plate 60 in position along the elongated slot 24 of the articulator base 14. The stem plate trapper 68 has a trapper top 70 and a trapper bottom 72. The trapper top 70 and the trapper bottom 72 are separated by a trapper thickness 74. The stem plate trapper 68 also has an elongated trapper slot 76 positioned slightly off center within the stem plate trapper 68. The elongated trapper slot 76 is correspondingly aligned with the elongated slot 24 of the articulator base 14, but the elongated trapper slot 76 is smaller than the elongated slot 24. Preferably, the elongated trapper slot 76 is approximately half the size of the elongated slot 24. The trapper top 70 is a concave arc and the trapper bottom 72 is a convex arc. The concave arc of the trapper top 70 and the convex arc of the trapper bottom 72 are approximately the same as the concave arc of the plate top 62 and the convex arc of the plate bottom 64, respectively. Additionally, the trapper thickness 74 is approximately the same as the plate thickness 66. The trapper top 70 has two trapper holes 78*a* and 78*b* positioned on opposite sides of the elongated trapper slot 74. The trapper holes 78*a* and 78*b* are each set within vertical trapper pillars 80*a* and 80*b*. At outermost point 81 of the trapper pillars 80*a* and 80*b*, the trapper pillars 80*a* and 80*b* overlap with the exterior of the stem plate trapper 68. The trapper pillars 80*a* and 80*b* extend outwardly from the trapper top 70 such that the surface of the trapper pillars 80*a* and 80*b* are evenly flat along the trapper holes 78*a* and 78*b* to the outermost point 81. From the trapper bottom 72, the trapper pillars 80*a* and 80*b* are hollow extending up from the trapper bottom 72 to the trapper holes 78*a* and 78*b*. The trapper pillars 80*a* and 80*b* are hollow on the bottom 72 for placement of the stem plate trapper 68 over the movable stem plate 60 and attachment to the articulator base 14 in order to secure the movable stem plate 60 in position along the elongated slot 24 of the articulator base 14.

The articulator base 14 has two vertical base pillars 82a and 82b on the top 20 of the articulator base 14. Each of the base pillars 82a and 82b have base holes 84a and 84b. The base pillars 82a and 82b extend outwardly from the top 20 of the articulator base 14 such that the surface of the base pillars 82a and 82b are evenly flat at base holes 84a and 84b. The base pillars 82a and 82b are positioned on opposite sides of the elongated slot 24 and correspondingly aligned with the trapper pillars 80a and 80b of the stem plate trapper 68, respectively. The base holes 84a and 84b are also correspondingly aligned with the trapper holes 78a and 78b. The base pillars 82a and 82b are, upon placement of the stem plate trapper 68 over the articulator base 14, received into the hollow portion of the trapper pillars 80a and 80b, respectively, from the trapper bottom 72 of the stem plate trapper 68. The diameter of the base pillars 82a and 82b is slightly less than the diameter of the trapper pillars 80a and 80b to permit easy placement of the stem plate trapper 68 and its trapper pillars 80a and 80b over the base pillars 82a and 82b of the articulator base 14. The base pillars 82a and 82b each have a base pillar height 86. The base pillar height 86 is approximately equal to the height of the hollow portion of the trapper pillars 80a and 80b from trapper bottom 72 up to trapper holes 78a and 78b or, likewise, the height of the trapper pillars 80a and 80b extending outwardly from the trapper top 70 to trapper holes 78a and 78b, as measured from closest point 83.

The light base 16, as discussed in FIG. 1, is placed over the top 20 of the articulator base 14 with the movable stem plate 60 and the stem plate trapper 68 located inside both the light base 16 and the articulator base 14. The light base 16 has two light base holes 88a and 88b. The light base holes 88a and 88b are situated on opposite sides of the light cup 47 and approximately half way between the light cup 47 and the exterior of the light base 16. The light base holes 88a and 88b are correspondingly aligned with the trapper holes 78a and 78b. The light base holes 88a and 88b have approximately the same diameter as the trapper holes 78a and 78b. Encircling each of the light base holes 88a and 88b is a cylindrical bevel 90. Preferably, the bevel 90 is cylindrical for ease of manufacturer and use. Alternatively, the bevel 90 could be any other shape including but not limited to a square, octagon, or hexagon. The bevel 90 extends outwardly from the light base 16 sufficient for the surrounding surface of the bevel 90 to be evenly flat along the light base holes 88a and 88b.

The light base 16, the stem plate trapper 68, and the articulator base 14 are secured together by two screws 92a and 92b (FIG. 4). Preferably, any type of screw may be used, but the screws must be of sufficient length to engage each of the parts: the light base 16, the stem plate trapper 68, and the articulator base 14. The screws 92a and 92b are inserted into holes 88a and 88b of the light base 16, respectively. Screw 92a is inserted into hole 88a of the light base 16. Screw 92a proceeds through hole 88a of the light base 16 to corresponding trapper hole 78a of the trapper pillar 80a and the stem plate trapper 68. Screw 92a continues to proceed through the trapper hole 78a of the trapper pillar 80a to corresponding base hole 84a of the articulator base 14. Likewise, screw 92b is inserted through hole 88b of the light base 16 and corresponding holes 78b of the stem plate trapper 68 and base hole 84b of the articulator base 14. The screws 92a and 92b are subsequently tightened into place using a screwdriver. In the preferred embodiment, the dome 18 must be removed from the light base 16 to facilitate the tightening of the screws 92a and 92b. The flat surfaces of the base pillars 82a and 82b and trapper pillars 80a and 80b from the trapper bottom 72 permit a flush and proper engagement of the articulator base 14 to the movable stem plate 60. The flat surface of the bevel 90 of the light base 16 permits a flush and proper tightening engagement of screws 92a and 92b to the bevel 90. The screws 92a and 92b are used to secure both the light base 16 to the articulator base 14 and to secure the position of the movable stem plate 60 between the stem plate trapper 68 and the articulator base 14. The stem 34 of the movable stem plate 60 may be repositioned anywhere along the elongated slot 24 of the articulator base 14. Upon loosening the screws 92a and 92b, one can traverse the plate 58 along the two parallel sides 26 and 28 of the elongated slot 24 and the top 20 of the articulator base 14 to reposition the stem 34. Once the stem 34 of the movable stem plate 60 is in its new position, the screws 92a and 92b are again tightened so that the stem plate trapper 68 and the articulator base 14 will frictionally secure the movable stem plate 60 in its new position.

Thus, there has been provided an articulated light head for navigational lights that procures variable alignment of the navigational light to conventional hull poles for all current and future boat designs. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. An articulated light head for navigational lights, comprising:

an articulator base, the articulator base being bowl shaped with a base top and a base bottom, the articulator base having a slot between the base top and the base bottom, the base top having two base pillars extending outwardly from the base top, the two base pillars each having a base hole;

a movable stem plate having a stem and a plate, the stem having a stem bore extending throughout the stem, the plate being perpendicular to the stem and having a plate top and a plate bottom with a plate bore between the plate top and the plate bottom that is aligned with the stem bore, the stem inserted through the slot until the plate bottom engages the base top, the stem permitted to traverse the slot into any position within the slot;

a stem plate trapper having a trapper top and a trapper bottom with a trapper slot, the stem plate trapper having two trapper pillars extending outwardly from the trapper top, the two trapper pillars each having a trapper hole, the trapper pillars aligned with the two base pillars, the stem plate trapper secured to the articulator base with the two trapper pillars each receiving a corresponding base pillar, the stem plate trapper securing the movable stem plate to the articulator base such that the stem may be situated into variable positions within the slot; and a light base secured to the articulator base, the light base having two light base holes each aligned with a corresponding trapper hole and a corresponding base hole, the light base supporting a light;

a dome secured to the light base and encapsulating the light.

2. The articulated light head of claim 1 wherein the articulator base, the movable stem plate, the stem plate trapper, the light base, and the dome are made of a durable grade plastic.

3. The articulated light head of claim 2 wherein the durable grade plastic for the dome is transparent.

4. The articulated light head of claim 1 wherein the base top is ribbed where the plate bottom engages the base top.

5. The articulated light head of claim 1 wherein the position of the stem within the slot is at an angle between 0° and 15° with respect to the vertical position of the stem within the articulator base.

6. The articulated light head of claim 1 wherein the articulator base, the stem plate trapper, and the light base are secured together by at least two screws.

7. The articulated light head of claim 1 further comprising electrical wires inserted through the stem bore, plate bore, and the trapper slot to power the light on the light base.

8. An articulated light head for navigational lights, comprising:

a light head base, the light head base having a top member and a bottom member, the top member and the bottom member separated and defining a hollow portion, the top member adapted for supporting a light for navigational purposes, the bottom member having a slot;

a movable stem plate contained within the hollow portion of the light head base and extending through the slot in an outwardly direction from the bottom member of the light head base, the movable stem plate permitted to traverse at variable positions along the slot; and a means for securing the movable stem plate in the variable positions along the slot.

9. The articulated light head of claim 8 wherein a dome is secured to the top member of the light head base.

10. The articulated light head of claim 9 wherein the dome encapsulates the light.

11. The articulated light head of claim 8 wherein the means for securing the movable stem plate in variable positions along the slot is a stem plate trapper contained within the hollow portion of the light head base and secured to the bottom member of the light head base with the movable stem plate situated between the stem plate trapper and the bottom member of the light head base.

12. The articulated light head of claim 11 wherein the stem plate trapper is secured to the bottom member of the light head base through at least two screws.

13. An articulated light head for navigational lights, comprising:

a light head base, the light head base having a top and a bottom, the top and the bottom separated and defining a hollow portion, the top adapted for supporting a light for navigational purposes, the bottom having a slot;

a movable stem plate contained within the hollow portion of the light head base and extending through the slot in an outwardly direction from the bottom of the light head base, the movable stem plate permitted to traverse at variable positions along the slot;

a stem plate trapper contained within the hollow portion of the light head base, the stem plate trapper secured to the bottom of the light head base for securing the movable stem plate in the variable positions along the slot, the movable stem plate situated between the stem plate trapper and the light head base; and a dome secured to the top of the light head base.

14. The articulated light head of claim 13 wherein the light head base and the stem plate trapper are secured together by at least two screws.

15. The articulated light head of claim 13 wherein the dome encapsulates the light.

* * * * *